United States Patent
Chen

(10) Patent No.: US 8,028,714 B2
(45) Date of Patent: Oct. 4, 2011

(54) WATER CONTROL VALVE CORE WITH A SEGMENTED LOCKING FUCTION

(75) Inventor: Mei-Li Chen, Tanzih Township, Taichung County (TW)

(73) Assignee: Kuching International Ltd., Tanzih Township, Taichung County (TW)

( * ) Notice: Subject to any disclaimer, the term of this patent is extended or adjusted under 35 U.S.C. 154(b) by 799 days.

(21) Appl. No.: 12/060,378

(22) Filed: Apr. 1, 2008

(65) Prior Publication Data
US 2009/0242821 A1    Oct. 1, 2009

(51) Int. Cl.
*F16K 25/00* (2006.01)
*F16K 51/00* (2006.01)

(52) U.S. Cl. ................ 137/454.6; 137/315.13
(58) Field of Classification Search ........... 137/454.6, 137/454.2, 625.4, 625.41, 625.17; 251/361
See application file for complete search history.

(56) References Cited

U.S. PATENT DOCUMENTS

| | | | | |
|---|---|---|---|---|
| 4,313,350 A | * | 2/1982 | Keller et al. | 74/526 |
| 4,478,249 A | * | 10/1984 | Fleischmann | 137/625.4 |
| 4,813,455 A | * | 3/1989 | Iqbal | 137/625.17 |
| 4,901,749 A | * | 2/1990 | Hutto | 137/270 |

\* cited by examiner

*Primary Examiner* — Stephen M Hepperle
*Assistant Examiner* — Jonathan Waddy
(74) *Attorney, Agent, or Firm* — Egbert Law Offices PLLC

(57) ABSTRACT

The present invention provides a lateral draft tube for a water control valve core, which is defined by a through-type groove and upper and lower openings. The through-type groove is sleeved around the shell of the water control valve core. The upper and lower portions have different diameters on the external wall of the draft tube. A ring flange is formed on the upper portion, and a guide ring surface is formed on the lower portion. The ring flange is provided with a sealing ring, and a drainage portion is arranged at the lower end of the draft tube to connect the through-type groove and guide ring surface. The draft tube can be located higher than the water control valve core, such that upward flow of the guide ring surface is not limited by the water control valve core. Thus, the upward flow of the water control valve core improves.

3 Claims, 4 Drawing Sheets

WATER CONTROL VALVE CORE WITH A SEGMENTED LOCKING FUCTION

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to an accessory of a water control valve core of a faucet, and more particularly to an innovative valve core with a lateral draft tube assembled externally onto the water control valve core.

2. Description of Related Art Including Information Disclosed Under 37 CFR 1.97 and 37 CFR 1.98

There are currently a variety of water control valve cores, which are comprised of a bottom inlet/outlet and bottom inlet/lateral outlet. As for water control valve core with a bottom inlet/outlet, the inlet/outlet guide channels of the faucet's valve groove are located at the bottom. So, the channels will be interleaved to connect the lateral outflow pipe, leading to bigger problems in fabrication and higher costs. For this reason, a raised water control valve core is developed in such a manner that both the inlet and outlet are arranged at the bottom, but the inlet is formed independently by a protruding tube to create a raised space at the bottom of the water control valve core, making it possible to discharge water laterally. However, the discharged water flows from the bottom of the water control valve core, namely, at the lower position of the faucet's valve groove, affecting and confining the height of the outflow pipe of the faucet. When the outflow pipe of the faucet is positioned higher than the outlet position of the water control valve core, a laterally recessed vertical guide space must be formed within the valve groove of the faucet to guide the water from water control valve core to the outflow pipe. Alternatively, a recessed upward guide surface is formed externally on the water control valve core; however, if a vertical guide space is formed within the faucet's valve groove, the recessed space will make it difficult for casting. On the other hand, if a guide surface is formed externally on the water control valve core, a sealing ring must be assembled at the top of the guide surface, so the maximum height of the guide surface will be obviously confined, leading to limited extension of the guide surface and limited height arrangement of faucet's outflow pipe.

Thus, to overcome the aforementioned problems of the prior art, it would be an advancement in the art to provide an improved structure that can significantly improve efficacy.

Therefore, the inventor has provided the present invention of practicability after deliberate design and evaluation based on years of experience in the production, development and design of related products.

BRIEF SUMMARY OF THE INVENTION

Based upon an innovative present invention, a draft tube is sleeved around the shell of the water control valve core, the draft tube being located higher than the water control valve core, so the upward flow of the guide ring surface is not limited by the water control valve core. Thus, the upward flow of the water control valve core greatly improves, thereby further raising the height of the faucet's outflow pipe to meet diversified operation requirements.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

The features and the advantages of the present invention will be more readily understood upon a thoughtful deliberation of the following detailed description of a preferred embodiment of the present invention with reference to the accompanying drawings.

Figure 1:
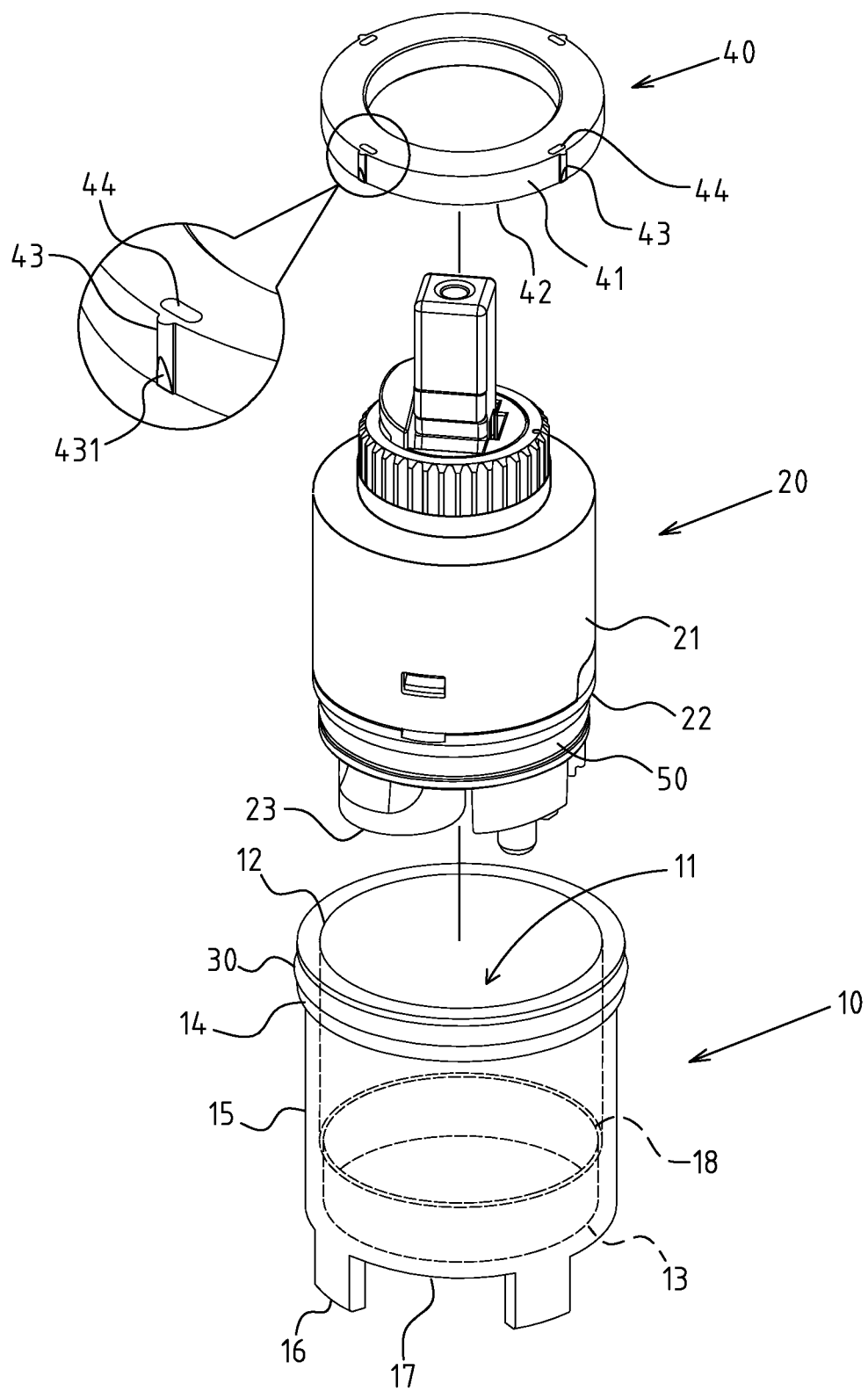
FIG. 1 shows an exploded perspective view of preferred embodiment of the present invention.
Figure 2:
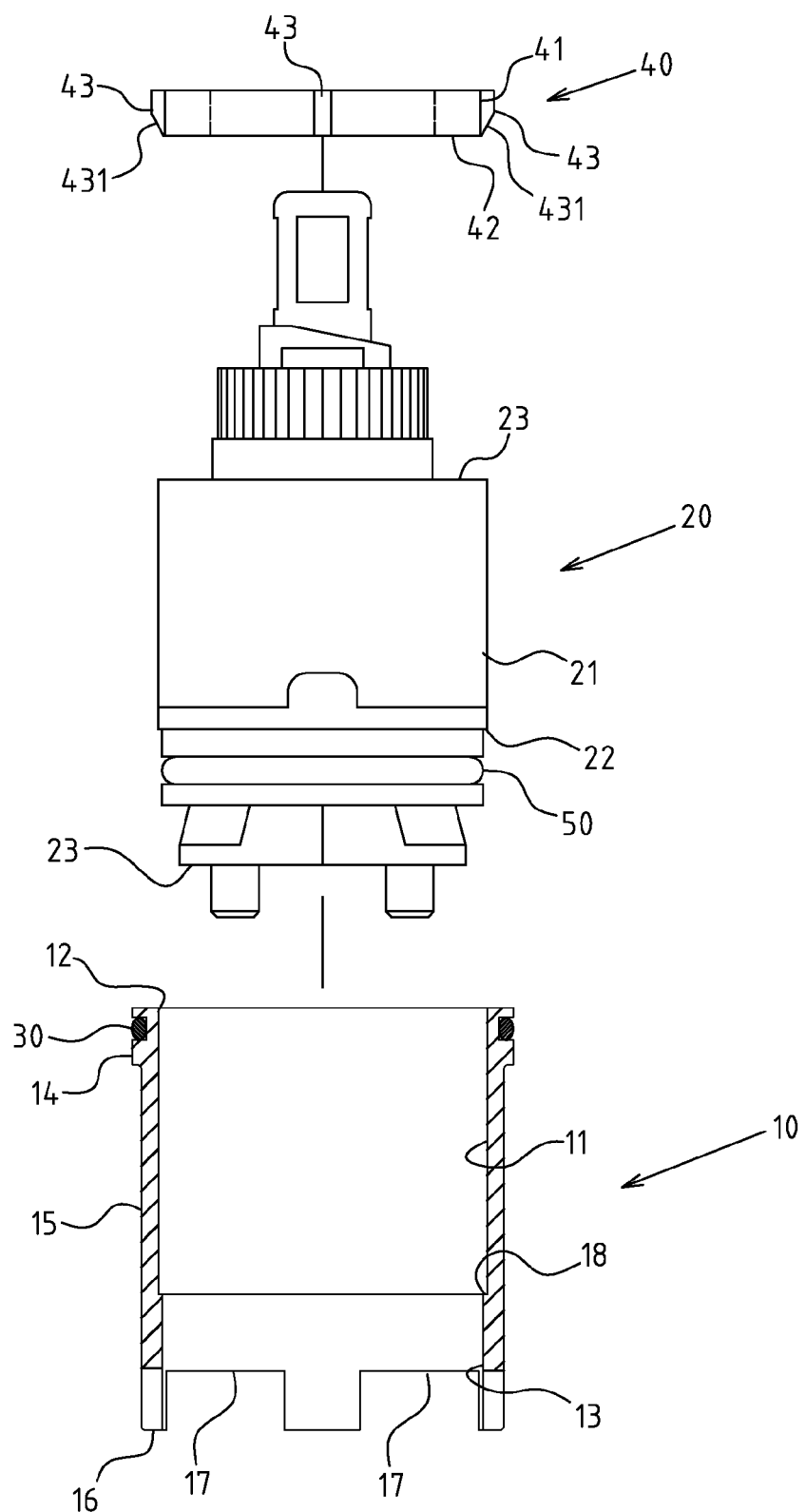
FIG. 2 shows an exploded sectional view of preferred embodiment of the present invention.
Figure 3:
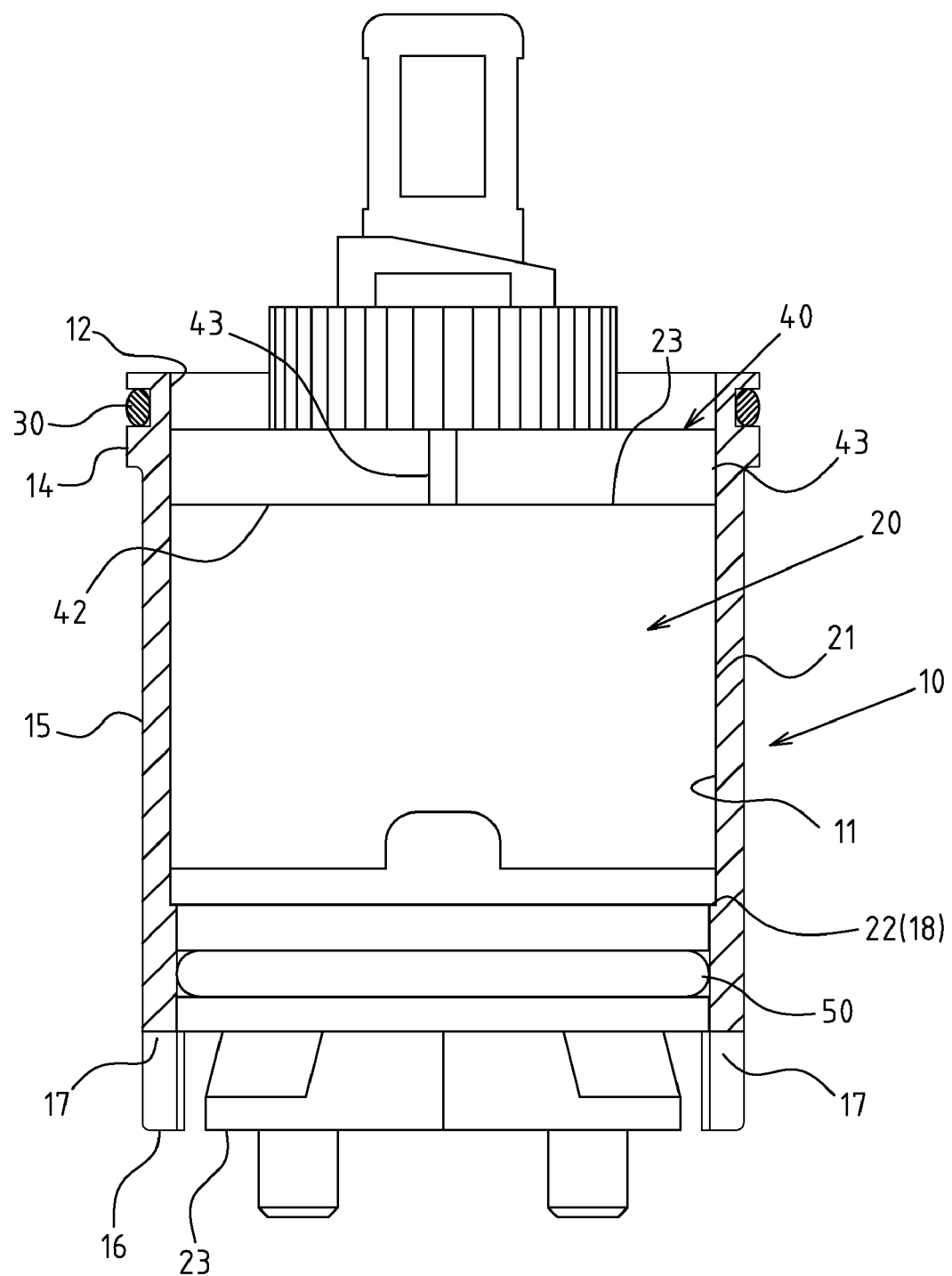
FIG. 3 shows an assembled sectional view of preferred embodiment of the present invention.

FIGS. 1-3 depict preferred embodiments of a lateral draft tube for a water control valve core of the present invention. The embodiments are only provided for explanatory purposes with respect to the patent claims.

The draft tube 10 is defined by a through-type groove 11, an upper opening 12 and a lower opening 13. The through-type groove 11 is sleeved around the shell 21 of the water control valve core 20, and then the draft tube 10 and water control valve core 20 are assembled securely via a positioning structure. Given the upper and lower portions with different diameters on the external wall of the draft tube 10, a ring flange 14 is formed on the upper portion, and a guide ring surface 15 formed on the lower portion. The ring flange 14 is provided with at least a sealing ring 30, and a drainage portion 17 is arranged at lower end 16 of the draft tube 10 to connect the through-type groove 11 and guide ring surface 15.

FIGS. 1 and 2 depict the positioning structure, which comprises a pressing ring 40 and a shoulder 18 formed in the through-type groove 11 of the draft tube 10. As such, a stopper flange 22 is formed on the shell 21 of the water control valve core 20 for being located at the shoulder 18 (shown in FIG. 3). The external side 41 of the pressing ring 40 is closely adapted to the through-type groove 11 of the draft tube 10, and the bottom 42 of the pressing ring 40 is pressed on the top 23 of the shell 21 of water control valve core 20. Moreover, the sealing rings 50 are arranged at intervals below the stopper flange 22 of the shell 21 of water control valve core 20, thus achieving leak-proof between through-type groove 11 of the draft tube 10. Some bulges 43 (convex particles or bars) are arranged at interval on the external side 41 of the pressing ring 40, while through-holes 44 are opened on the recessed part correspondingly to the bulges 43, such that the bulges 43 present shrinkage flexibility. In this way, the external side 41 of the pressing ring 40 could be positioned satisfactorily via the bulges 43 when it is pressed on the through-type groove 11 of the draft tube 10. A bevel edge 431 is arranged at bottom of the bulge 43 of the pressing ring 40, so that the bulge 43 could be easily assembled into the draft tube 10.

The lower end 16 of the draft tube 10 is flush with the bottom surface 23 of the water control valve core 20 (shown in FIG. 3), while the drainage portion 17 is arranged at intervals on the lower end 16 of the draft tube 10, and also recessed upwards.

Figure 4:
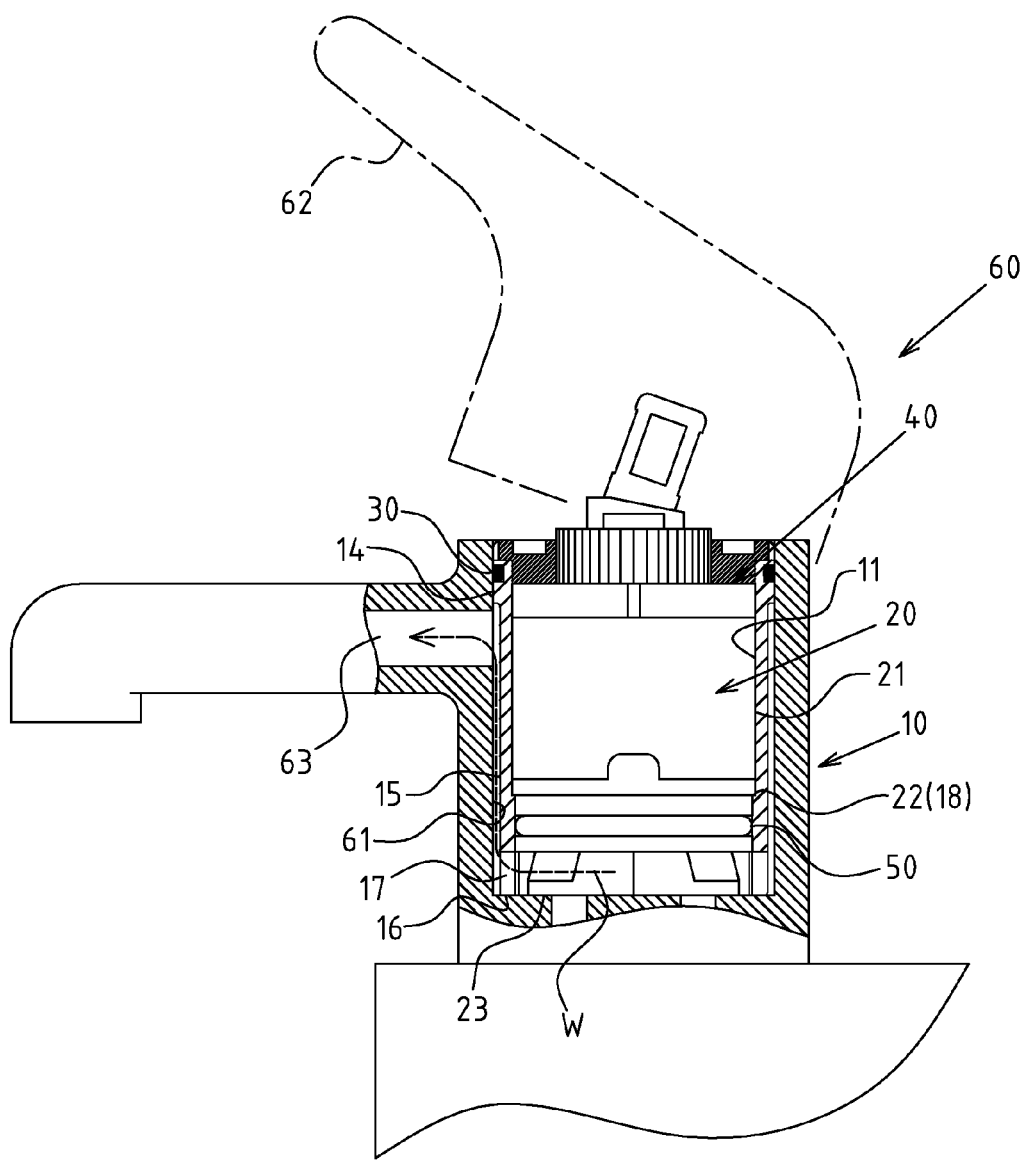
FIG. 4 shows a sectional view of the application view of the draft tube of the present invention.

Based upon above-specified structures, the present invention is operated as follows:

Referring to FIG. 4, the draft tube 10 and water control valve core 20 are assembled into the space of the valve groove 61 of the faucet 60. The draft tube 10 permits the upper ring flange 14 to be inserted into the valve groove 61 of the faucet 60, thus serving the purpose of leak-proofing via the sealing ring 30. A circular guide space extending vertically is formed at intervals between the guide ring surface 15 and valve groove 61 at lower section of the draft tube 10. When the water control valve core 20 is activated by the switch 62 of the faucet 60 for a power supply state, water flow W is guided out from the bottom of the water control valve core 20, then passes through the drainage portion 17 at lower end 16 of the draft tube 10, and turns upwards to flow along the circular guide space between the guide ring surface 15 and valve groove 61, finally flowing out from the outflow channel 63 at the preset front location of valve groove 61 of the faucet 60.

I claim:

1. An apparatus comprising:
    a faucet having a valve groove therein, said faucet having a water inlet and a water outlet;
    a draft tube received in said valve groove of said faucet, said draft tube having a through groove formed therein, said draft tube having an upper opening and a lower opening;
    a water control valve core sleeved within said through groove of said draft tube, said draft tube having an upper portion and a lower portion, said upper portion of said draft tube having a ring flange extending circumferentially therearound, said lower portion having a guide surface extending in spaced relation to an inner wall of said valve groove of said faucet, said ring flange having at least one sealing ring extending therearound, said draft tube having a drainage portion at a lower end thereon, said drainage portion communicating with a space defined between said guide surface and said inner wall of said valve groove, an inlet to said water outlet of said faucet positioned adjacent an upper end of said valve core, said water outlet communicating with said space; and
    a positioning structure having a ring and a shoulder, said positioning structure positioned in said through-groove of said draft tube, said ring extending around said upper end of said valve core and said valve core residing upon an upper end of said shoulder, said ring having an external surface juxtaposed against said inner wall of said draft tube, said external surface of said ring having a plurality of bulges extending outwardly therefrom, said shoulder having a plurality of through-holes formed adjacent respective bulges of said plurality of bulges.

2. The apparatus of claim 1, wherein each of said plurality of bulges having a beveled surface at a bottom thereof.

3. The apparatus of claim 1, wherein said draft tube having a lower end flush with a bottom surface of said water control valve core, said drainage portion extending downwardly from said lower end of said draft tube.

* * * * *